US010345616B2

(12) United States Patent
Chou

(10) Patent No.: US 10,345,616 B2
(45) Date of Patent: Jul. 9, 2019

(54) EYEGLASSES ASSEMBLY STRUCTURE

(71) Applicant: HSIEN CHANG OPTICAL INDUSTRIAL CO., LTD., Tainan (TW)

(72) Inventor: Wen-Hsiung Chou, Tainan (TW)

(73) Assignee: Hsien Chang Optical Industrial Co., Ltd., Tainan (TW)

( * ) Notice: Subject to any disclaimer, the term of this patent is extended or adjusted under 35 U.S.C. 154(b) by 1 day.

(21) Appl. No.: 15/699,239

(22) Filed: Sep. 8, 2017

(65) Prior Publication Data
US 2019/0079312 A1    Mar. 14, 2019

(51) Int. Cl.
*G02C 1/08* (2006.01)
(52) U.S. Cl.
CPC ........... *G02C 1/08* (2013.01); *G02C 2200/06* (2013.01); *G02C 2200/08* (2013.01)
(58) Field of Classification Search
CPC . G02C 1/04; G02C 1/08; G02C 5/008; G02C 2200/06; G02C 2200/08
USPC ............................................. 351/41, 90–102
See application file for complete search history.

(56) References Cited

U.S. PATENT DOCUMENTS

| 2005/0151925 | A1* | 7/2005 | Chen ........................ | G02C 1/08 351/90 |
| 2006/0132705 | A1* | 6/2006 | Li ............................. | G02C 1/08 351/90 |
| 2017/0219843 | A1* | 8/2017 | Albouy ................. | G02C 5/2209 |
| 2017/0336649 | A1* | 11/2017 | Chen ........................ | G02C 5/00 |
| 2017/0336650 | A1* | 11/2017 | Chen ........................ | G02C 9/00 |
| 2017/0357104 | A1* | 12/2017 | Chen ........................ | G02C 1/08 |

* cited by examiner

*Primary Examiner* — Darryl J Collins
(74) *Attorney, Agent, or Firm* — Rosenberg, Klein & Lee

(57) ABSTRACT

An eyeglasses assembly structure is disclosed herein. It mainly comprises an upper frame having a first connecting part and two upper connecting parts; and a lower frame having a second connecting part and two lower connecting parts. The first connecting part has a receiving slot, two protrusions and two engaging slots disposed in the receiving slot, and each of the two upper connecting parts has an engaging hole. The second connecting part has two inserting blocks for correspondingly inserting into the receiving slot, two engaging blocks disposed on outer sides of the two inserting blocks for engaging with the two engaging slots, and two concave slots disposed on outer sides of the two inserting blocks for receiving the two protrusions, and each of the two lower connecting parts has an engaging member for engaging with the engaging hole of each of the two upper connecting parts.

5 Claims, 8 Drawing Sheets

EYEGLASSES ASSEMBLY STRUCTURE

BACKGROUND OF THE INVENTION

1. Field of the Invention

The present invention relates to provide an eyeglasses assembly structure which can assemble to lenses or disassemble from lenses easily without the need of other tools and has trendy and changeable appearance to meet the demands for fashion and variation so that the present invention has increased competitiveness in the market and increased practical features of overall implementation.

2. Description of Related Art

Generally, various eyeglasses can be classified according to different specific purposes and functions, e.g. myopia glasses, presbyopic glasses, sunglasses for protecting the eyes from sunshine or for matching fashion, and safety glasses for eye protection during work. No matter what kind of eyeglasses, it mainly comprises a frame, lenses disposed and fixed in the frame, and a pair of temples screwed to two sides of the frame so that a user can wear the eyeglasses by the pair of temples.

Although all kinds of conventional eyeglasses mentioned above can achieve their intended effects, they still have many disadvantages in the actual operation of use:

1. The conventional eyeglasses require screw components and other tools for assembling the lenses to the frames, so the lenses and the frames cannot be attached to or detached from each other easily and have restrictions on the overall structural design that needs to be improved.

2. The frames of the conventional eyeglasses are usually formed integrally so that the color or appearance of the frames cannot be changed, resulting in a monotonous overall appearance of the conventional eyeglasses and losing the product competitiveness in the market.

SUMMARY OF THE INVENTION

In view of the above-mentioned problems, the object of the present invention is to provide an eyeglasses assembly structure which comprises an upper frame, and a lower frame engaged with the upper flame for further engaging with lenses. Accordingly, the upper frame and the lower frame of the present invention can be assembled or disassembled from each other without the need of other tools, and the lenses can be assembled between the upper frame and the lower frame easily. Furthermore, the overall appearance of a pair of glasses can be altered by changing different colors of the upper frame and the lower frame to meet the demands for fashion and variation so that the present invention has increased competitiveness in the market and increased practical features in use.

Disclosed herein is an eyeglasses, assembly structure. It mainly comprises an upper frame and a lower frame.

The upper frame has a first connecting part in a middle thereof, two upper lens assembly portions disposed on two sides of the first connecting part, and two upper connecting parts at two lateral ends thereof. The first connecting part is provided with a receiving slot on an inner face thereof, two engaging slots disposed on two internal sides of the receiving slot, and two protrusions disposed on two sides of the receiving slot, and each of the two upper connecting parts is provided with an engaging hole.

The lower frame having, a second connecting part in a middle thereof and corresponding to the first connecting part of the upper frame, two lower lens assembly portions disposed on two sides of the second connecting part, and two lower connecting parts at two lateral ends thereof and corresponding to the two upper connecting parts of the upper frame. The second connecting part is provided with two inserting blocks for correspondingly inserting into the receiving slot of the first connecting part, two engaging blocks disposed on outer sides of the two inserting blocks for correspondingly engaging with the two engaging slots, and two concave slots disposed on outer sides of the two inserting blocks for correspondingly receiving the two protrusions, and each of the two lower connecting parts is provided with an engaging member for engaging with the engaging hole of each of the two upper connecting parts.

According to an embodiment of the present invention, the first connecting part is provided with a perforation on an outer face thereof for communicating with the receiving slot, and the second connecting part is provided with a stop member for correspondingly engaging with the perforation of the first connecting part.

According to an embodiment of the present invention, each of the two upper connecting parts is provided with a positioning recess on a lower edge thereof, and each of the two lower connecting parts is provided with a positioning block for correspondingly engaging with the positioning recess of each of the two upper connecting parts.

DETAILED DESCRIPTION OF THE PREFERRED EMBODIMENT

Figure 1:
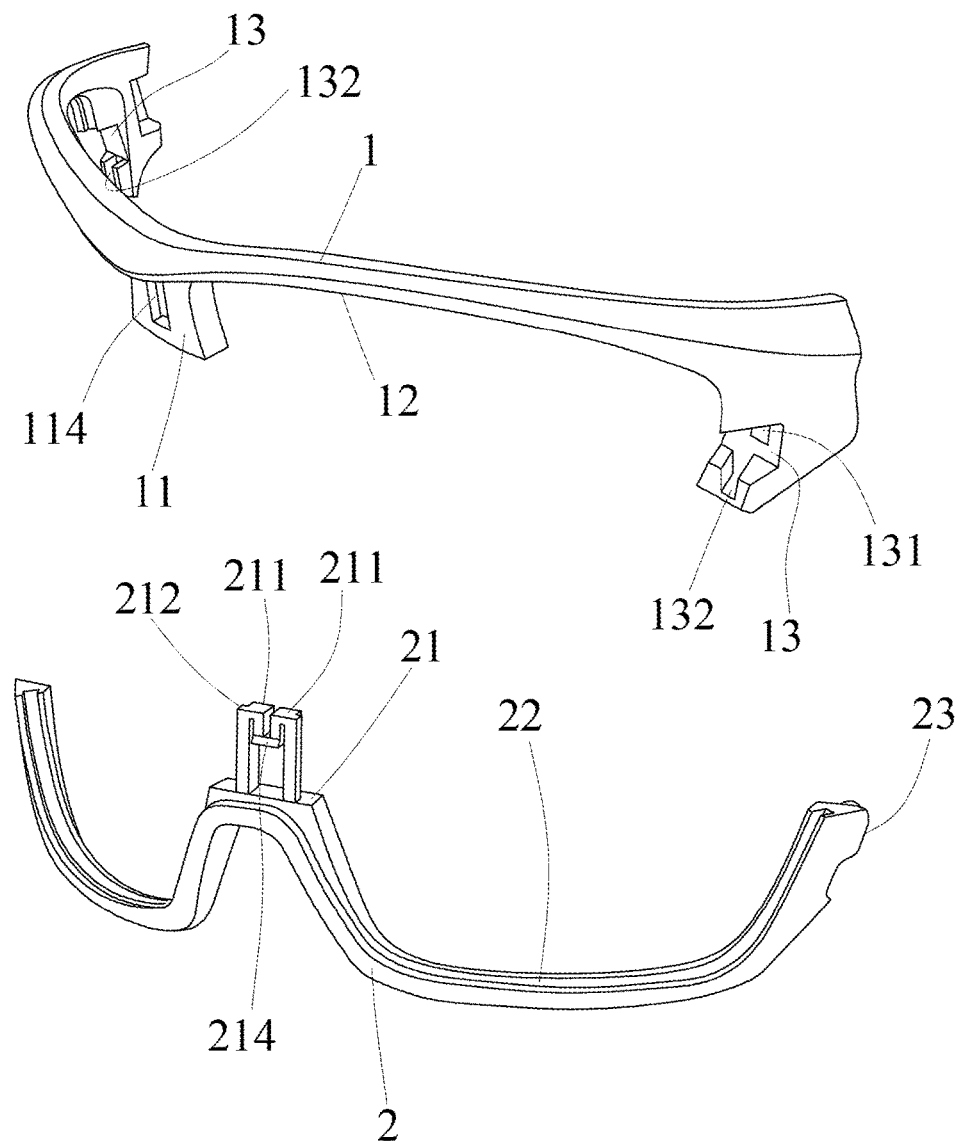
FIG. 1 is a front view showing an eyeglasses assembly structure according to the present invention.
Figure 2:
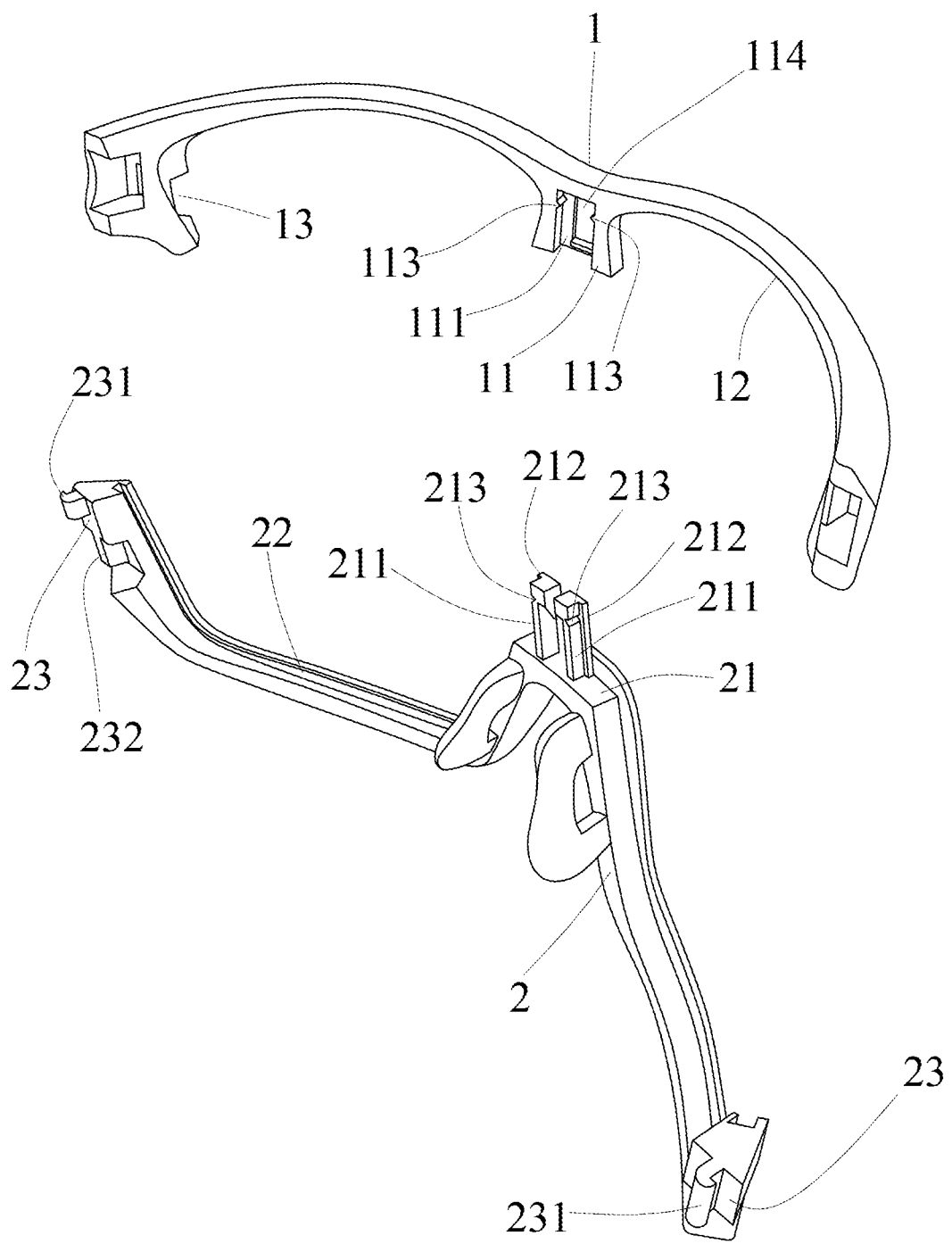
FIG. 2 is a back view showing an eyeglasses assembly structure according to the present invention.
Figure 3:
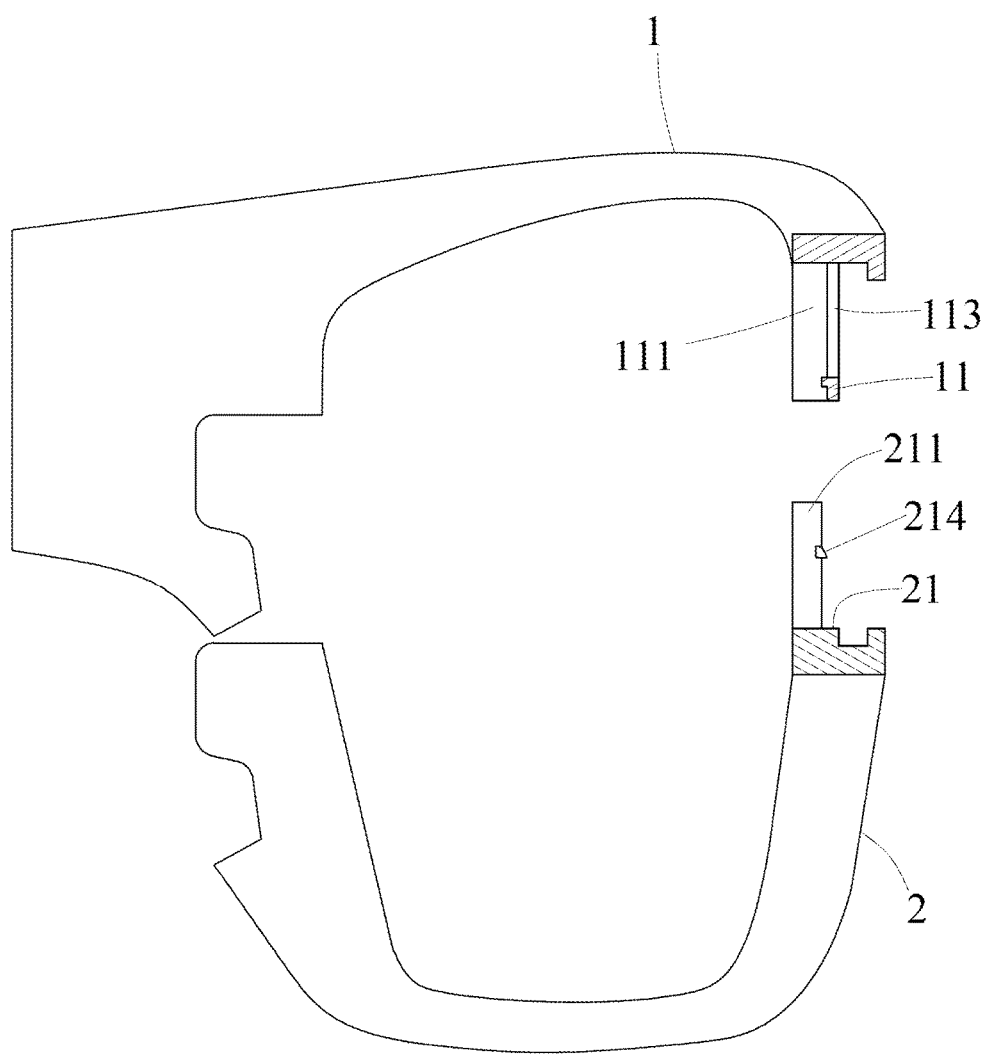
FIG. 3 is a partial enlarged view showing a first connecting part and a second connecting part.
Figure 4:
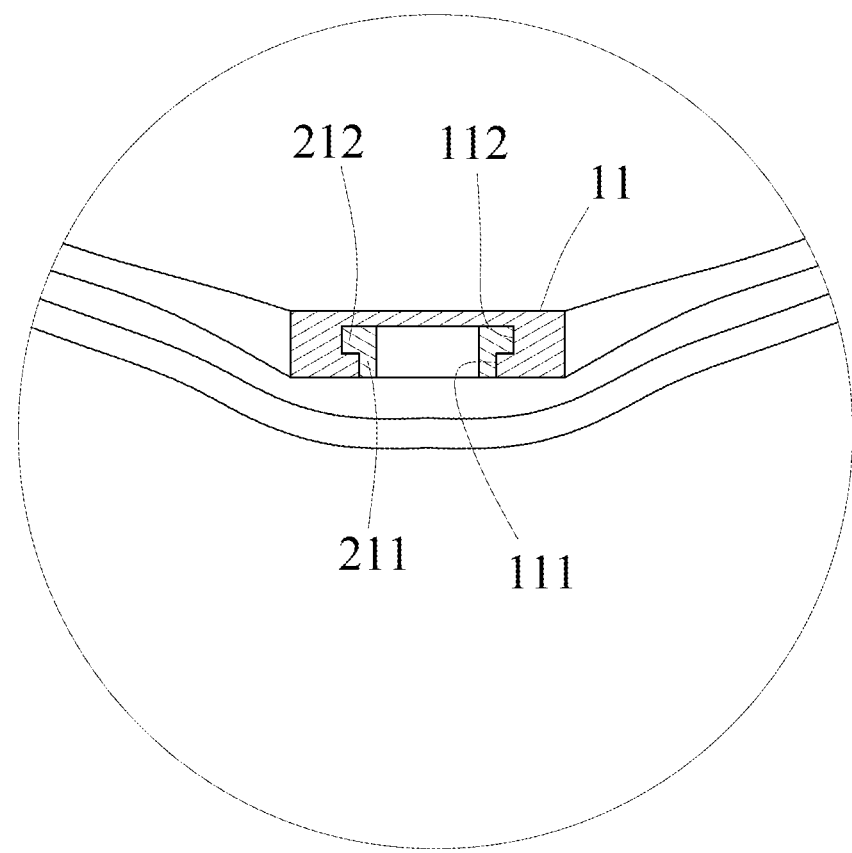
FIG. 4 is a partial enlarged view showing two inserting blocks and two engaging blocks are correspondingly inserted into a receiving slot and two engaging slots respectively.
Figure 5:
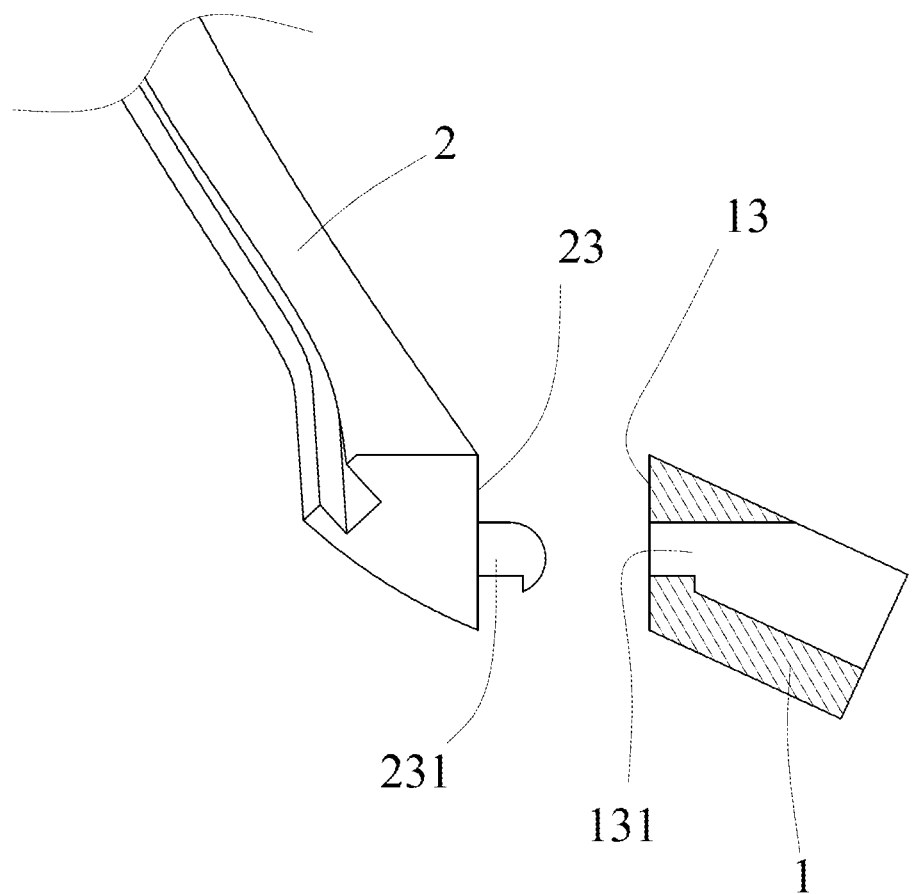
FIG. 5 is a partial enlarged view showing an upper connecting part having an engaging hole and a lower connecting part having an engaging member.

Hereinafter, an exemplary embodiment of the present invention will be described in detail with reference to the accompanying drawings.

As shown in FIG. 1-5, an eyeglasses assembly structure of the present invention is disclosed. It mainly comprises an upper frame (1) and a lower frame (2).

The upper frame (1) has a first connecting part (11) in a middle thereof. The first connecting part (11) has a receiving slot (111) on an inner face thereof, two engaging slots (112) disposed on two internal sides of the receiving slot (111), two protrusions (113) protruded from two sides of the receiving slot (111), and a perforation (114) on an outer face thereof for communicating with the receiving slot (111). Moreover, the upper frame (1) further has two upper lens assembly portions (12) disposed on two sides of the first connecting part (11), and two upper connecting parts (13) at two lateral ends thereof. Each of the two upper connecting parts (13) is provided with an engaging hole (131) and a positioning recess (132) on a lower edge thereof.

The lower frame (2) has a second connecting part (21) in a middle thereof and corresponding to the first connecting part (11) of the upper frame (1). The second connecting part (21) has two inserting blocks (211) corresponding to the receiving slot (111) of the first connecting part (11), two engaging blocks (212) protruded from outer sides of the two inserting blocks (211) for correspondingly engaging with the two engaging slots (112) in the receiving slot (111), two concave slots (213) disposed on outer sides of the two inserting blocks (211) for correspondingly receiving the two protrusions (113) disposed on two sides of the receiving slot (111), and a stop member (214) corresponding to the perforation (114) of the first connecting part (11). Moreover, the lower frame (2) further has two lower lens assembly portions (22) disposed on two sides of the second connecting part (21), and two lower connecting parts (23) at two lateral ends thereof and corresponding to the two upper connecting parts (13) of the upper frame (1). Each of the two lower connecting parts (23) is provided with an engaging member (231) for engaging with the engaging hole (131) of each of the two upper connecting parts (13) and a positioning block (232) for correspondingly engaging with the positioning recess (132) of each of the two upper connecting parts (13).

Figure 6:
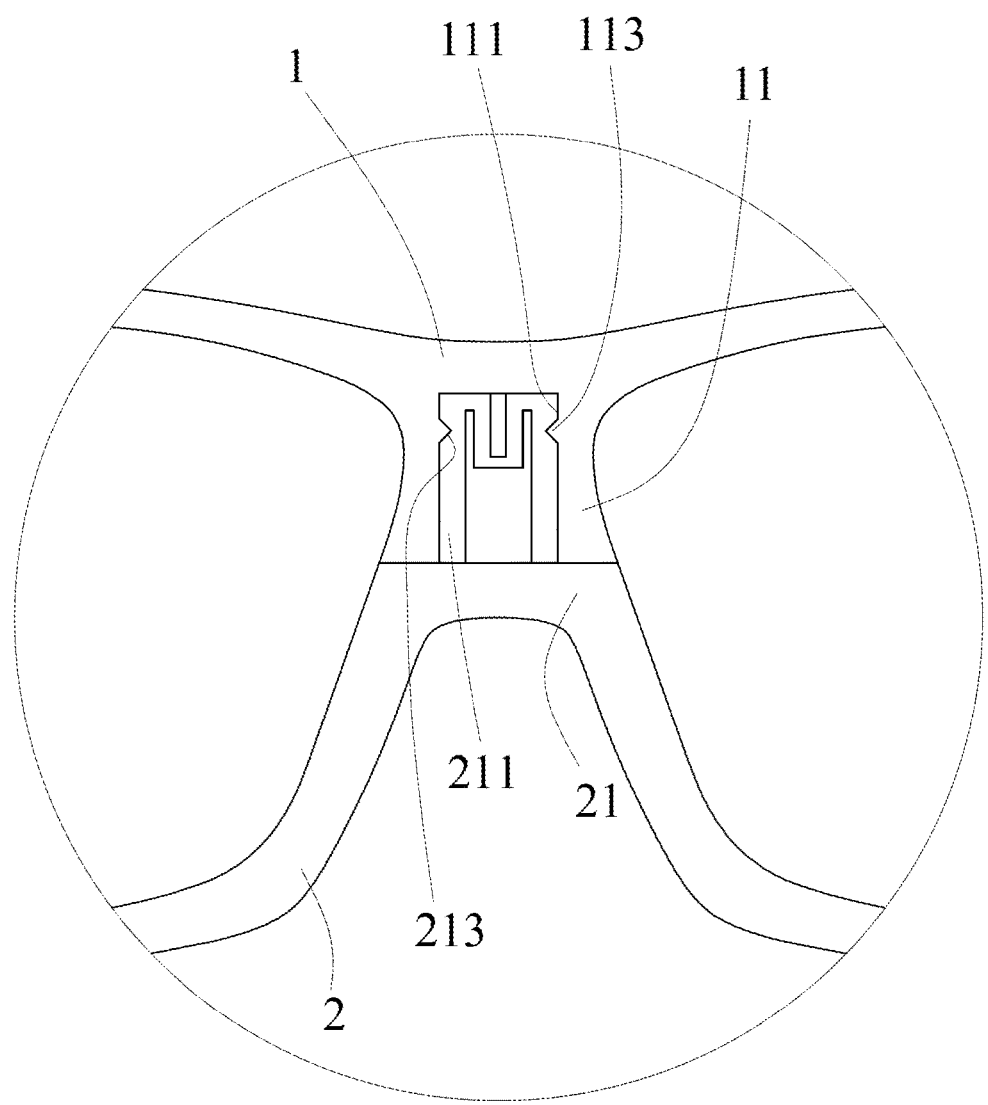
FIG. 6 is a partial enlarged view showing a receiving slot and two protrusions are respectively engaged with two inserting blocks and two concave slots.
Figure 7:
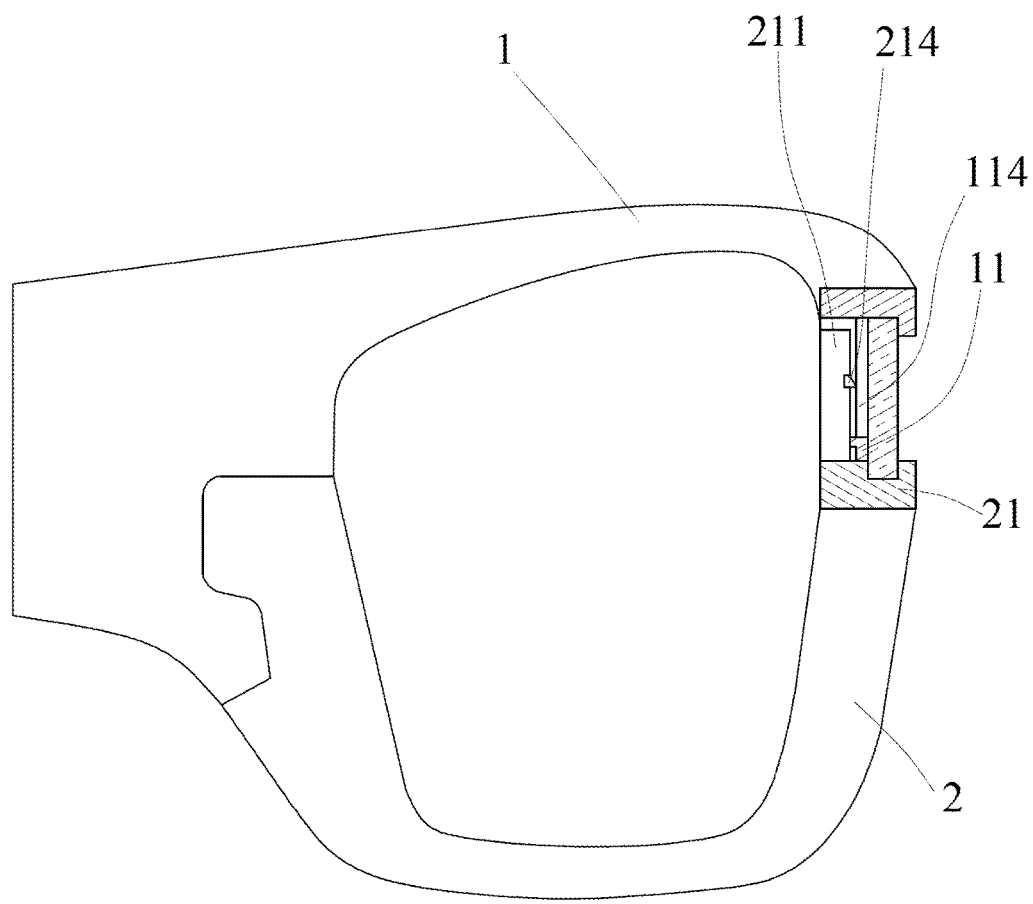
FIG. 7 is a partial enlarged view showing a perforation of an upper frame is engaged with a stop member of a lower frame.
Figure 8:
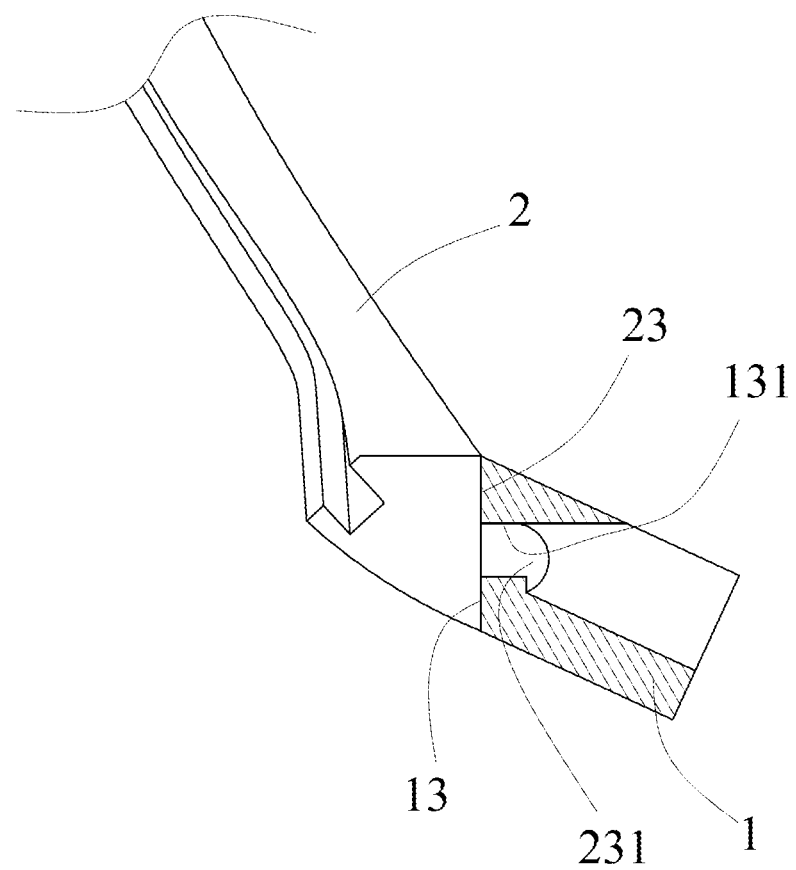
FIG. 8 is a partial sectional view showing an engaging hole of an upper connecting part is engaged with an engaging member of a lower connecting part.

Accordingly, in assembling the present invention, the lower frame (2) is correspondingly disposed below the upper frame (1) by inserting the second connecting part (21) of the lower frame (2) into the first connecting part (11) of the upper frame (1) and inserting the two inserting blocks (211) of the second connecting part (21) into the receiving slot (111) of the first connecting part (11). In such a case, as shown in FIG. 6, the two engaging blocks (212) disposed on outer sides of the two inserting blocks (211) are correspondingly engaged with the two engaging slots (112) in the receiving slot (111), and the two concave slots (213) disposed on outer sides of the two inserting blocks (211) are correspondingly engaged with the two protrusions (113) disposed on two sides of the receiving slot (111). Moreover, as shown in FIG. 7, the stop member (214) on the two inserting blocks (211) is located in the perforation (114) of the first connecting part (11). Thus, the lower frame (2) can not only stop a movement of a lower edge of the perforation (114) of the upper frame (1) by the stop member (214) to prevent the lower frame (2) detaching from the upper frame (1) but also allow the stop member (214) to move up and down within the perforation (114) of the upper frame (1). Furthermore, as shown in FIG. 8, the two lower connecting parts (23) of the lower frame (2) corresponding to the two upper connecting parts (13) of the upper frame (1) allows the engaging members (231) of the two lower connecting parts (23) to insert into the engaging holes (131) of the two upper connecting parts (13) and allows the positioning blocks (232) of the two lower connecting parts (23) to engage with the positioning recesses (132) of the two upper connecting parts (13) so that the upper frame (1) can be firmly bonded to the lower frame (2) and then the lenses can be assembled between the two upper lens assembly portions (12) of the upper frame (1) and the two lower lens assembly portions (22) of the lower frame (2) easily.

According to the above description, in comparison with the traditional technique, an eyeglasses assembly structure according to the present invention has the advantages as following:

1. The upper frame and the lower frame of the present invention can be assembled by engagement and disassembled from each other without the need of other tools, and the lenses can be assembled between the upper frame and the lower frame easily, so the present invention has increased practical features of overall implementation in use.

2. The overall appearance of the eyeglasses assembly structure can be altered by changing different colors of the upper fame and the lower frame to meet the demands for fashion and variation so that the present invention has increased competitiveness in the market.

What is claimed is:

1. An eyeglasses assembly structure, comprising:
   an upper frame having a first connecting part in a middle thereof, two upper lens assembly portions disposed on two sides of the first connecting part, and two upper connecting parts at two lateral ends thereof, wherein the first connecting part is provided with:
   a receiving slot on an inner face thereof,
   a perforation on an outer face thereof for communicating with the receiving slot,
   two engaging slots disposed on two internal sides of the receiving slot, and
   two protrusions disposed on two sides of the receiving slot, and
   wherein each of the two upper connecting parts is provided with an engaging hole; and
   a lower frame having a second connecting part in a middle thereof and corresponding to the first connecting part of the upper frame, two lower lens assembly portions disposed on two sides of the second connecting part, and two lower connecting parts at two lateral ends thereof and corresponding to the two upper connecting parts of the upper frame, wherein the second connecting part is provided with:
   two inserting blocks for correspondingly inserting into the receiving slot,
   a stop member for engaging with the perforation of the first connecting part,
   two engaging blocks disposed on outer sides of the two inserting blocks for correspondingly engaging with the two engaging slots, and
   two concave slots disposed on outer sides of the two inserting blocks for correspondingly receiving the two protrusions, and
   wherein each of the two lower connecting parts is provided with an engaging member for engaging with the engaging hole of each of the two upper connecting parts.

2. The eyeglasses assembly structure as claimed in claim 1, wherein each of the two upper connecting parts is further provided with a positioning recess on a lower edge thereof below the corresponding engaging hole, and each of the two lower connecting parts is further provided with a positioning block for correspondingly engaging with the positioning recess of each of the two upper connecting parts.

3. The eyeglasses assembly structure as claimed in claim 1, wherein the stop member of the second connecting part moves vertically within the perforation of the first connecting part while engaged therewith.

4. The eyeglasses assembly structure as claimed in claim 1, wherein the inserting blocks of the second connecting part are inserted vertically into the receiving slot of the first connecting part, and the engaging members of the lower connecting parts are inserted horizontally into the respective engaging holes of the upper connecting parts.

5. An eyeglasses assembly structure, comprising:
  an upper frame having a first connecting part in a middle thereof, two upper lens assembly portions disposed on two sides of the first connecting part, and two upper connecting parts at two lateral ends thereof, wherein the first connecting part is provided with:
    a receiving slot on an inner face thereof,
    two engaging slots disposed on two internal sides of the receiving slot, and
    two protrusions disposed on two sides of the receiving slot, and
  wherein each of the two upper connecting parts is provided with an engaging hole; and
  a lower frame having a second connecting part in a middle thereof and corresponding to the first connecting part of the upper frame, two lower lens assembly portions disposed on two sides of the second connecting part, and two lower connecting parts at two lateral ends thereof and corresponding to the two upper connecting parts of the upper frame, wherein the second connecting part is provided with:
    two inserting blocks for correspondingly inserting into the receiving slot,
    two engaging blocks disposed on outer sides of the two inserting blocks for correspondingly engaging with the two engaging slots, and
    two concave slots disposed on outer sides of the two inserting blocks for correspondingly receiving the two protrusions,
  wherein each of the two lower connecting parts is provided with an engaging member for engaging with the engaging hole of each of the two upper connecting parts, and
  wherein the inserting blocks of the second connecting part are inserted vertically into the receiving slot of the first connecting part, and the engaging members of the lower connecting parts are inserted horizontally into the respective engaging holes of the upper connecting parts.

* * * * *